United States Patent [19]
Yamamoto et al.

[11] Patent Number: 5,652,383
[45] Date of Patent: Jul. 29, 1997

[54] LONGITUDINAL GRIP FORCE ESTIMATING DEVICE AND SLIP CONTROL DEVICE FOR VEHICLE

[75] Inventors: Osamu Yamamoto; Shuji Shiraishi, both of Saitama; Osamu Yano, Tochigi, all of Japan

[73] Assignee: Honda Giken Kogyo Kabushiki Kaisha, Tokyo, Japan

[21] Appl. No.: 560,097

[22] Filed: Nov. 17, 1995

[30] Foreign Application Priority Data

Nov. 18, 1994 [JP] Japan ................................ 6-285026

[51] Int. Cl.$^6$ ........................................... B60K 28/16
[52] U.S. Cl. ................... 73/495; 180/197; 364/426.031
[58] Field of Search ................... 73/488, 495; 180/197; 364/426.027, 426.029, 426.031, 426.032, 426.036

[56] References Cited

U.S. PATENT DOCUMENTS

| | | | |
|---|---|---|---|
| 4,933,857 | 6/1990 | Hashiguchi et al. | 364/426.031 |
| 4,985,836 | 1/1991 | Hashiguchi et al. | 364/426.036 |
| 4,985,837 | 1/1991 | Togai et al. | 364/426.031 |
| 4,985,838 | 1/1991 | Hashiguchi et al. | 364/426.036 |
| 5,046,009 | 9/1991 | Abo et al. | 364/426.032 |
| 5,047,940 | 9/1991 | Onaka et al. | 364/426.031 |
| 5,070,960 | 12/1991 | Nobumoto et al. | 364/426.031 |
| 5,119,299 | 6/1992 | Tamura et al. | 364/426.031 |
| 5,124,922 | 6/1992 | Akiyama | 364/426.031 |
| 5,137,105 | 8/1992 | Suzuki et al. | 364/426.031 |
| 5,212,641 | 5/1993 | Iwata et al. | 364/426.031 |
| 5,222,570 | 6/1993 | Kawamura et al. | 364/426.031 |
| 5,245,542 | 9/1993 | Itoh et al. | 364/426.036 |
| 5,255,192 | 10/1993 | Ito et al. | 364/426.029 |
| 5,255,193 | 10/1993 | Katayose et al. | 364/426.031 |
| 5,283,742 | 2/1994 | Wazaki et al. | 364/426.032 |
| 5,287,279 | 2/1994 | Anan | 364/426.032 |
| 5,459,661 | 10/1995 | Yagi et al. | 364/426.031 |
| 5,471,386 | 11/1995 | Hrovat et al. | 364/426.027 |
| 5,504,680 | 4/1996 | Yamashita et al. | 364/426.03 |

*Primary Examiner*—Richard Chilcot
*Assistant Examiner*—Eric S. McCall
*Attorney, Agent, or Firm*—Armstrong, Westerman, Hattori, McLeland & Naughton

[57] ABSTRACT

A first longitudinal grip force FGG is calculated by differentiating a vehicle body speed by time. A driven wheel torque is calculated from an engine torque and a second longitudinal grip force FGT is calculated from the driven wheel torque. The first longitudinal grip force FGG and the second longitudinal grip force FGT are compared with each other, and the higher one of such grip force is selected as a longitudinal grip force TG. When the vehicle travels on a normal flat road, the first longitudinal grip force FGG obtained from the vehicle body speed is selected. But when the vehicle travels on an ascent road, on which the first longitudinal grip does not indicate an accurate value, the second longitudinal grip force FGT obtained from the engine torque is selected. With this arrangement, the longitudinal grip force is accurately estimated even if the vehicle travels on such an ascent road.

3 Claims, 5 Drawing Sheets

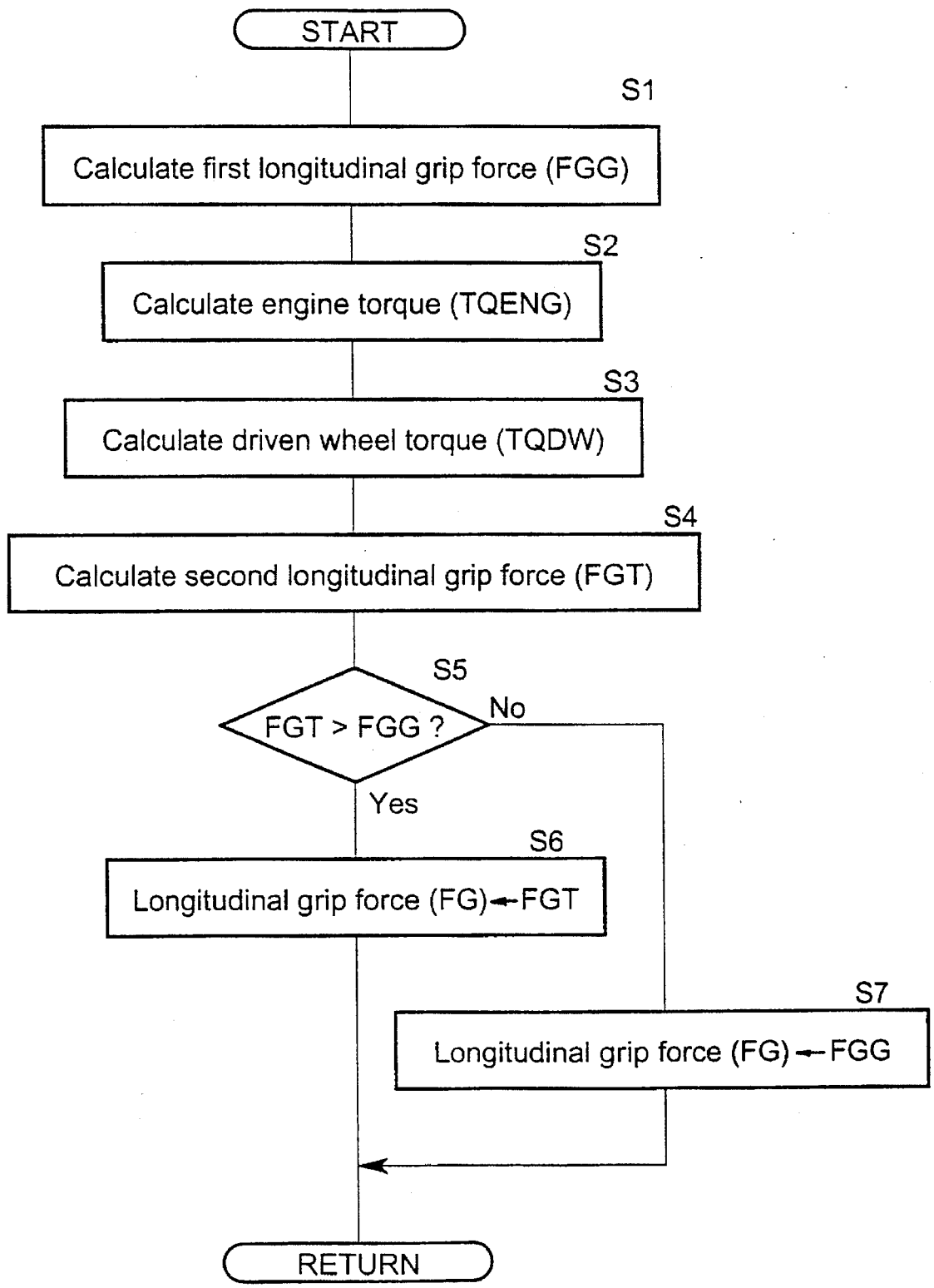

LONGITUDINAL GRIP FORCE ESTIMATING DEVICE AND SLIP CONTROL DEVICE FOR VEHICLE

BACKGROUND OF THE INVENTION

1. Field of the Invention

The present invention relates to a longitudinal grip force estimating device for a vehicle and to a slip control device for a vehicle using such an estimating device.

2. Description of the Prior Art

A grip force of a driven wheel is a torque which is transmitted from the driven wheel to a road surface. A magnitude of such torque is proportional to a magnitude of an acceleration of the vehicle.

Conventionally, as a longitudinal grip force of a driven wheel of a vehicle, an output from a longitudinal acceleration sensor was used, as it was, or a longitudinal acceleration obtained by differentiating a follower wheel speed (i.e., a vehicle body speed), by time, was used.

A longitudinal grip force estimated by such a conventional technique exhibits a sufficient accuracy when the vehicle travels on a flat road surface. However, the vehicle travels on an ascent road, on which it is difficult for vehicles to accelerate, such a longitudinal grip force indicates a value smaller than an actual longitudinal grip force. As a result, an error, or difference, is produced in the estimated longitudinal grip force, which may make it difficult to accurately control the grip of the driven wheel.

SUMMARY OF THE INVENTION

The present invention has been accomplished in view of the above circumstances. Thus, it is an object of the invention to accurately estimate a longitudinal grip force, even if the vehicle travels on an ascent road, and to reliably control an excessive slip of a driven wheel based on the longitudinal grip force.

To achieve the above object, according to a first aspect of the invention, there is provided a longitudinal grip force estimating device for a vehicle comprising: a longitudinal grip force calculating means for calculating a first longitudinal grip force from a vehicle speed obtained from follower wheel speed, an engine torque calculating means for calculating an engine torque, a driven wheel torque calculating means for calculating a driven wheel torque from the engine torque, a second longitudinal grip force calculating means for calculating a second longitudinal grip force from a driven wheel, and a high select means for comparing the first and the second longitudinal grip forces to select the higher one of such first and second grip force as a longitudinal grip force.

With the above arrangement, when the first longitudinal grip force is decreased, during traveling on an ascent road, and a deviation from the actual longitudinal grip force increases, the second longitudinal grip force is substituted for the first longitudinal grip force. Therefore, an accurate longitudinal grip force can be estimated even when the vehicle travels on an ascent road.

The second longitudinal grip force calculating means calculates the second longitudinal grip force, based on the follower wheel speed, the throttle opening degree, the engine revolution numbers and the shift position. Therefore, an accurate second longitudinal grip force can be obtained.

Further, according to a second aspect of the invention, there is provided a slip control device, including a longitudinal grip force estimating device as defined in the above first aspect of the invention, and further comprising: a driven wheel speed calculating means for calculating a driven wheel speed of a vehicle, a slip state judging means for comparing a slip rate of the driven wheel, calculated from the driven wheel speed and the follower wheel speed, with a target slip rate to judge the slip state of the driven wheel, and an engine output control device for controlling the output from the engine, based on the slip state of the driven wheel, wherein a total grip force of the vehicle is calculated from a lateral grip force of the vehicle and the longitudinal grip force, selected by the high select means, and the target slip rate is corrected by the total grip force.

With the above arrangement, it is possible to appropriately control the slip by accurately judging a road condition by the total grip force and by correcting the target slip rate in accordance with the magnitude of the total grip force, thereby improving the traction properties.

The above and other objects, features and advantages of the invention, will become apparent from preferred embodiments taken in conjunction with the accompanying drawings.

BRIEF DESCRIPTION OF THE DRAWINGS

FIGS. 1 to 5 show one embodiment of the present invention, wherein:

FIG. 1 is a diagrammatic illustration of a vehicle including a traction control system;

FIG. 2 is a block diagram of a control system;

FIG. 3 is a block diagram showing a circuit of an electronic control unit;

FIG. 4 is a block diagram of a longitudinal grip force calculating means; and

FIG. 5 is a flow chart for estimating a longitudinal grip force.

DESCRIPTION OF A PREFERRED EMBODIMENT

Figure 1:
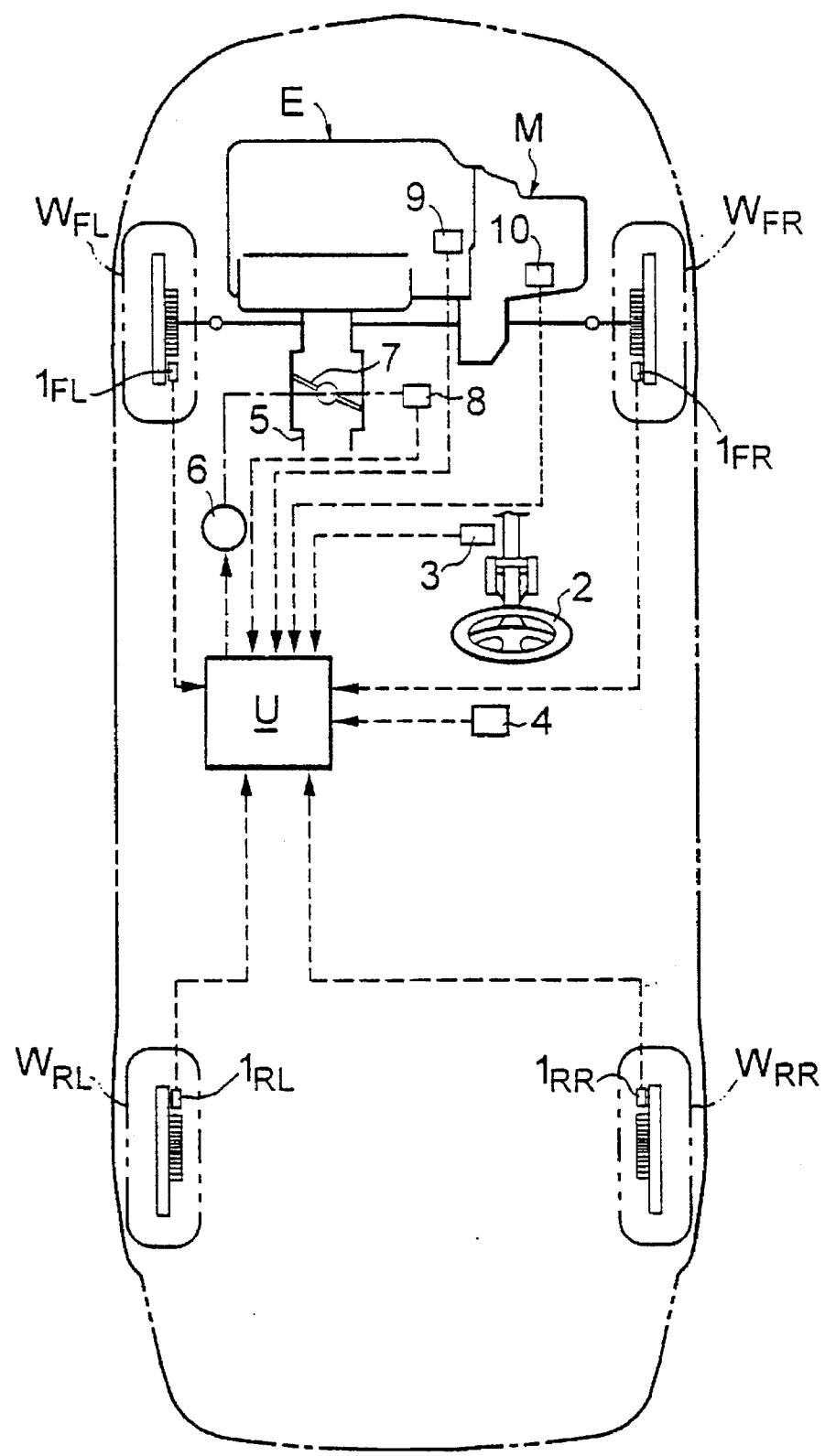

FIG. 1 shows a front-wheel drive vehicle having a pair of left and right driven wheels $W_{FL}$ and $W_{FR}$ driven by an engine E, as well as a pair of left and right follower wheels $W_{RL}$ and $W_{RR}$. The driven wheels $W_{FL}$ and $W_{FR}$ are provided with driven wheel speed detecting means $1_{FL}$ and $1_{FR}'$ respectively. The follower wheels $W_{RL}$ and $W_{RR}$ are provided follower wheel speed detecting means $1_{RL}$ and $1_{RR}'$ respectively.

The steering wheel 2 is provided with a steerage angle detecting means 3 for detecting a steerage angle δ and the vehicle body is provided, in place, with lateral acceleration detecting means 4 for detecting lateral acceleration LG. An intake passage 5 of the engine E is provided with a throttle valve 7 which is connected to a pulse motor 6 and is driven for opening and closing. An opening degree θ TH of the throttle valve 7 is detected by a throttle opening degree detecting means 8. The engine E is provided with an engine revolution numbers detecting means 9 for detecting engine revolution numbers Ne. A transmission M is provided with a shift position detecting means 10 for detecting a shift position SP.

Connected to an electronic control unit U, having a microcomputer, are: the driven wheel speed detecting means $1_{FL}$ and $1_{FR}$; the follower wheel speed detecting means $1_{RL}$ and $1_{RR}$; the steerage angle detecting means 3; the lateral acceleration detecting means 4; the pulse motor 6; the throttle opening degree detecting means 8; the engine revolution numbers detecting means 9; and the shift position detecting means 10.

Figure 2:
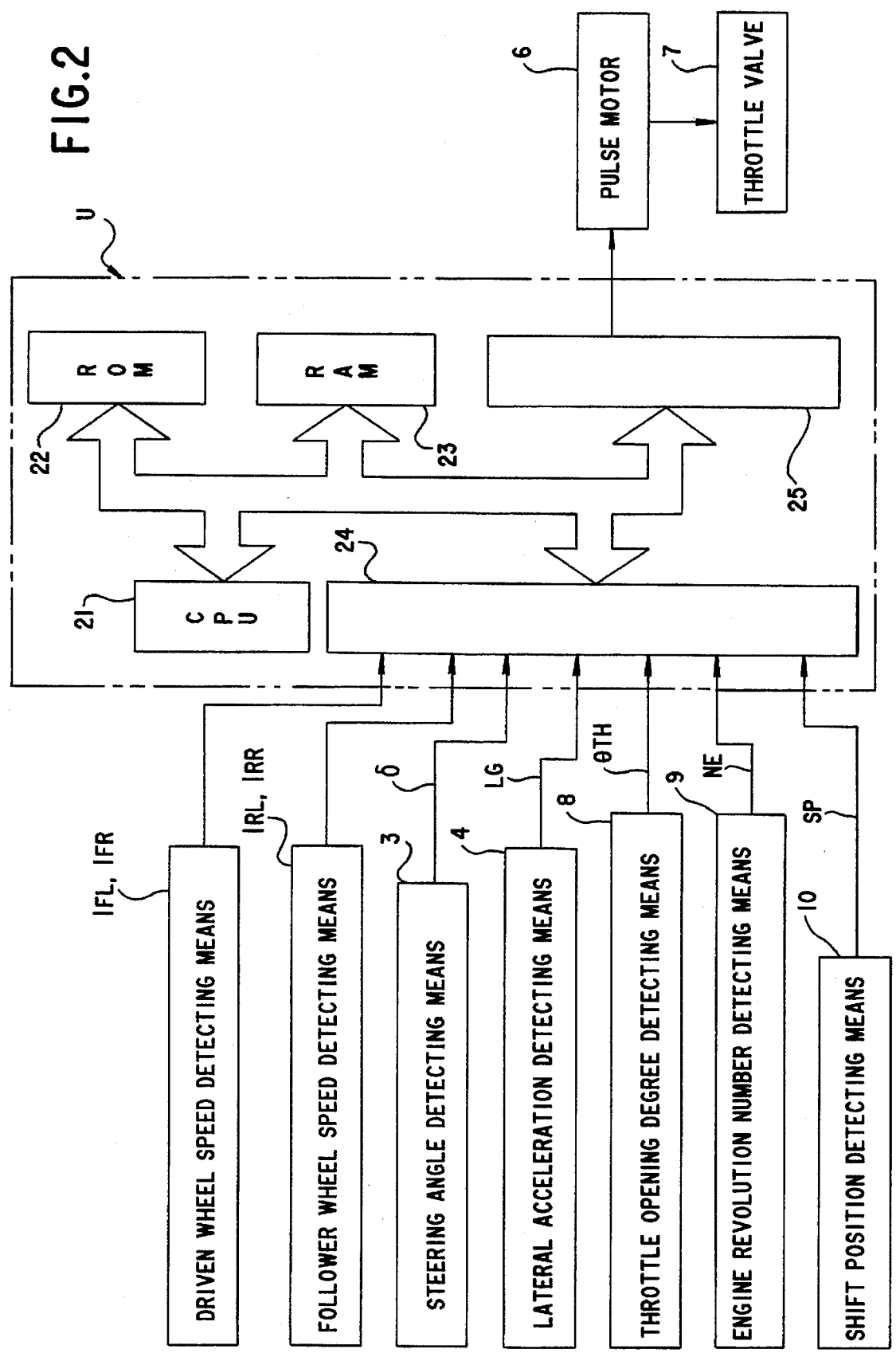

FIG. 2 shows the electronic control unit U. When the excessive slip of the driven wheels $W_{FL}$ or $W_{FL}$, is detected, in order to control such excessive slip, the electronic control unit U calculates signals from the various detecting means, based on a control program so as to drive the throttle valve 7 by the pulse motor 6 to control the output from the engine E. The electronic control unit U includes: a central processing unit (CPU) 21 for conducting the calculation; a read-only memory (ROM) 22 in which the control program, data such as various maps, or the like, are stored; a random-access memory (RAM) 23 for temporarily storing the calculation result, or output signals, from the various detecting means. The electronic control unit U also includes an input section 24 and an output section 25. The pulse motor 6 is connected to the output section 25. Connected to the input section 24 are the various detecting means, i.e., the driven wheel speed detecting means $1_{FL}$ $1_{FR}$; the follower wheel speed detecting means $1_{RL}$ $1_{RR}$; the steerage angle detecting means 3; the lateral acceleration detecting means 4; the throttle opening degree detecting means 8; the engine revolution numbers detecting means 9; and the shift position detecting means 10.

The electronic control unit U calculates, by the CPU 21, various signals inputted from the input section 24 and data stored in the read-only memory 22, and the like, based on the control program which will be described hereinafter, and finally drives the pulse motor 6 through the output section 25. By this, the throttle valve 7 is controlled and output of the engine E is varied so that the excessive slip of the driven wheels $W_{FL}$, and $W_{FR}$ is controlled.

Outline of a traction control system will be described below with reference to FIG. 3.

Output signals VWDL and VWDR of the left and right driven wheel speed detecting means $1_{FL}$, and $1_{FR}$ are inputted to the driven wheel speed calculating means 31, where the driven wheel speed VWNHOS is obtained as the average value of the output signals VWDL and VWDR of the left and right driven wheel speed detecting means $1_{FL}$ and $1_{FR}$.

Output signals VWNL and VWNR from the left and right follower wheel speed detecting means $1_{RL}$, and $1_{RR}$ are inputted to a vehicle body speed calculating means 32, where the follower wheel speed WVNHOS is obtained as the average value of the output signals VWNL and VWNR of the left and right follower wheel speed detecting means $1_{RL}$, and $1_{RR}$. Such follower wheel speed WNHOS is determined as a vehicle speed VVN.

Further, the output signals VWNL and VWNR, of the follower wheel speed detecting means $1_{RL}$, and $1_{RR}$, are inputted to the actual yaw rate rotational vibration value calculating means 33, where the actual yaw rate Y and a rotational vibration value $\Delta$ V are obtained based on a deviation between the output signal VWNL and VWNR of the follower wheel speed detecting means $1_{RL}$, and $1_{RR}$.

The output signals from the throttle opening degree detecting means 8, the engine revolution number detecting means 9 and the shift position detecting means 10, as well as the vehicle speed VVN, obtained in the vehicle body speed calculating means 32, are inputted to the longitudinal grip force calculating means 34, where a longitudinal grip force FG is calculated. The function of the longitudinal grip force calculating means 34 will be described in detailed with reference to FIGS. 4 and 5.

The longitudinal grip force FG outputted from the longitudinal grip force calculating means 34, and a lateral acceleration LG of the vehicle outputted from the lateral acceleration detecting means 4 are inputted to a grip controlling means 35, where a total grip force TG is obtained as a vector sum of the longitudinal grip force FG and lateral acceleration LG.

A steerage angle $\delta$ outputted by the steerage angle detecting means 3, and the vehicle body velocity VVN outputted by the vehicle body velocity calculating means 32 are inputted to a reference yaw rate calculating means 36, where a reference yaw rate $Y_{REF}$, which the vehicle naturally generates in accordance with the operational condition is obtained. A reference yaw rate $Y_{REF}$, outputted by the reference yaw rate calculating means 36, and an actual yaw rate Y outputted by the actual yaw rate/rotational vibration calculating means 33 are input to steering stability controlling means 37, where it is judged whether the vehicle is in an over steered state or an under steered state.

A rotational vibration value $\Delta$ V outputted by the actual yaw rate-rotational vibration value calculating means 33 is inputted to a bad road controlling means 38, where it is judged whether or not the road is in a bad condition such as a bumpy road, based on magnitude of the rotational vibration value $\Delta$ V.

The driven wheel velocity VWNHOS, outputted by the driven wheel velocity calculating means 31, and the vehicle body velocity VVN outputted by the vehicle body velocity calculating means 32 are input to a target slip rate calculating means 39, where a target slip rate is obtained. The target slip rate is a target value for reducing the slip rate of the driven wheels $W_{FL}$ and $W_{FR}$, if a slip rate of the driven wheel $W_{FL}$ and $W_{FR}$, calculated from the driven wheel speed VWNHOS, and the vehicle body speed VVN exceeds a predetermined value. At that time, the target slip rate is corrected, based on the total grip force TG, outputted by the grip controlling means 35, and the steering condition outputted by the steering stability controlling means 37, and the road surface condition outputted by the bad road controlling means 38.

In other words, when the total grip force TG is large, the target slip rate is corrected toward a higher value, so that a sharp traveling is possible without impairing the slip controlling function of the driven wheels $W_{RL}$ and $W_{FR}$. Moreover, a target slip rate is also corrected toward a higher value when the driven wheel $W_{FL}$ and $W_{FR}$ are on a bad road on which the vehicle will not slip easily.

In addition, because the vehicle is a front-wheel drive vehicle, when the vehicle is in the over-steered state, the target slip rate is corrected toward a higher value, and when the vehicle is in the under-steered state, the target slip rate is corrected toward the lower value. This prevents the vehicle from turning toward an undesirable direction.

An engine output controlling means 40 drives the pulse motor 6, based on the target slip rate outputted by the target slip rate calculating means 39, so as to adjust the opening degree of the throttle valve 7, thereby reducing the output of the engine E. As a result, a slip rate of the driven wheels $W_{FL}$ and $W_{FR}$ is converged to the target slip rate and an excessive slip of the driven wheels $W_{FL}$ and $W_{FR}$ is restrained.

Figure 3:
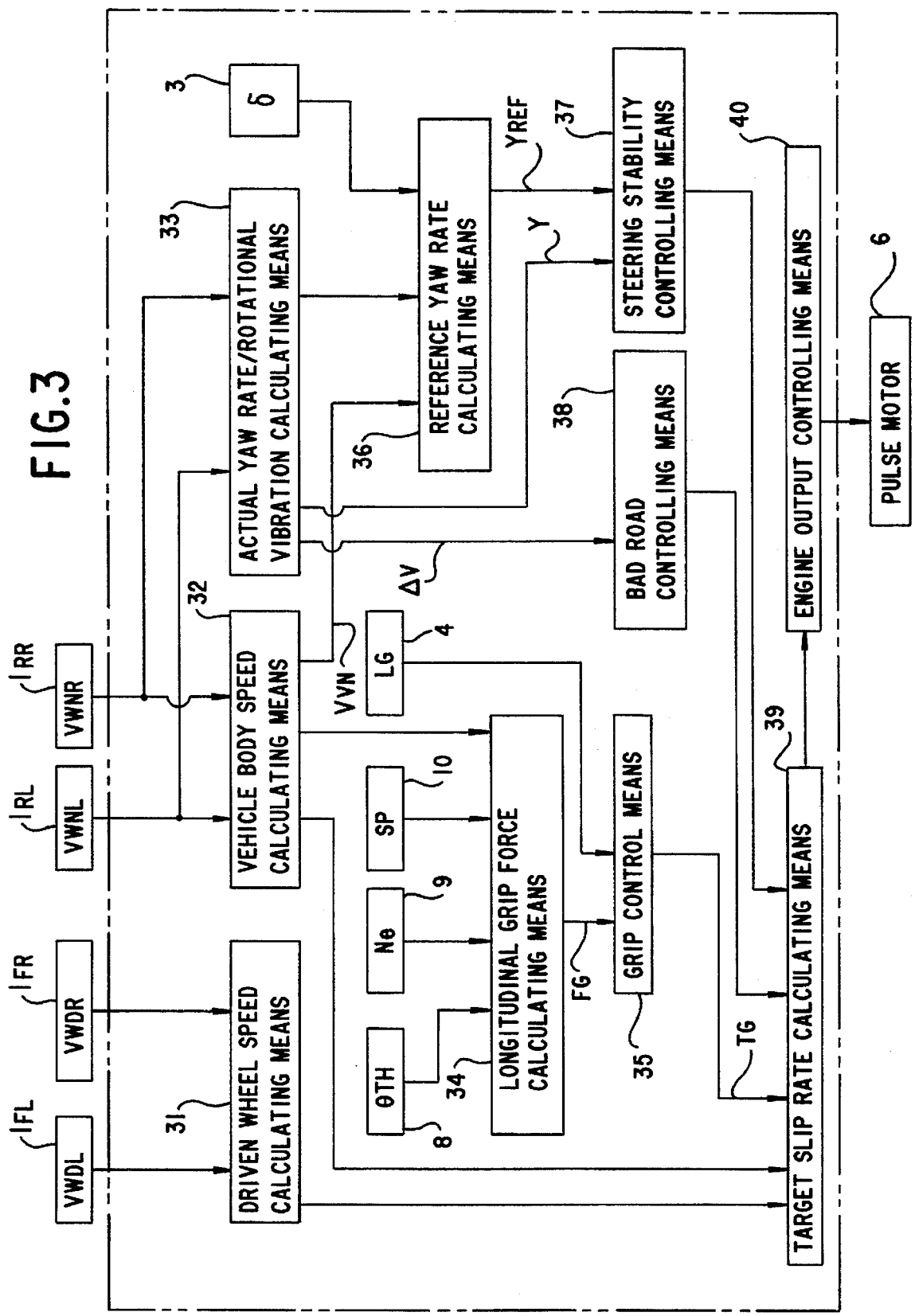

Next, a function of the longitudinal grip force calculating means 34 in a block diagram of FIG. 3 is described in detail with reference to a block diagram of FIG. 4 and a flow chart of FIG. 5.

Figure 4:
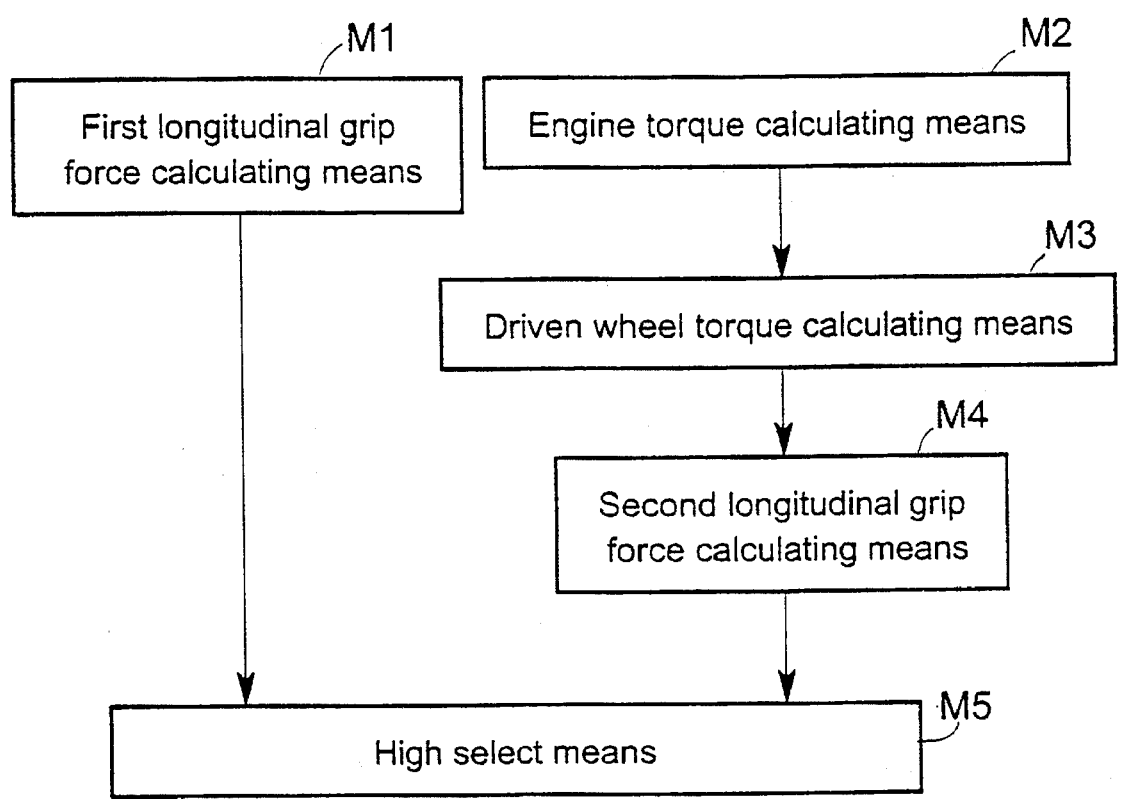

First, in a first longitudinal grip force calculating means M1, FIG. 4, the vehicle body speed VVN is differentiated by time to obtain a first longitudinal grip force FGG as a vehicle body longitudinal acceleration (step S1, FIG. 5). Next, in an engine torque calculating means M2; FIG. 4, an engine torque TQENG (step S2, FIG. 5) is map-searched based on the engine revolution numbers Ne, outputted by the engine revolution numbers detecting means 9, and the throttle opening degree θ TH, outputted by the throttle opening degree detecting means 8 (step S2). Then, in a driven wheel torque calculating means M3; FIG. 4, the engine torque TQENG is multiplied by a gear ratio GIAHX which corresponds to the shift position, outputted by the shift position detecting means 10, to provide the driven wheel torque TQDW [TQENG×GIAHX] (step S3). Here, the gear ratio GIAHX includes a transmission efficiency of a gear.

And in the longitudinal grip force calculating means M4, 2nd longitudinal grip force FGT, S5, FIG. 5 is calculated by dividing the driven wheel torque TQDW by the driven wheel radius Dr and the driven wheel load $D_{WEIGHT}$ [FGT=TQDW/(Dr×$D_{WEIGHT}$)].

When the first longitudinal grip force FGG as the vehicle body longitudinal acceleration and the second longitudinal grip force obtained by the engine torque TQENG, the higher one of the first and the second longitudinal grip force FGG and FGT is selected in the high select means M5.

More specifically, first and the second longitudinal grip force FGG and FGT are compared with each other, and if FGT>FGG, the second longitudinal grip force FGT is selected as a final longitudinal grip force FG at step S6. On the contrary, if FGT≦FGG, the first longitudinal grip force FGG is selected as a final longitudinal grip force FG at step S7. In this manner, at steps S5 to S7, higher one of the first longitudinal grip force FGG, as a vehicle body longitudinal acceleration, and the second longitudinal grip force FGT obtained by the engine torque TQDW, is selected as a final longitudinal grip force FG.

When the vehicle travels on a flat road, the first longitudinal grip force FGG, as a vehicle body longitudinal acceleration, exhibits a sufficient accuracy as a longitudinal grip force. On the contrary, when the vehicle travels on an ascent road, the first longitudinal grip force FGG, as a vehicle body longitudinal acceleration, becomes smaller than the actual longitudinal grip force. However, when the vehicle travels on such an ascent road, i.e., when the answer at the step S5 in the flowchart in FIG. 5 is "YES" (the second longitudinal grip force FGT obtained by the engine torque TQENG is larger than the first longitudinal grip force FGG as a vehicle body longitudinal acceleration), the second longitudinal grip is selected, instead of the first longitudinal grip force FGG.

Therefore, an accurate longitudinal grip force FG can be obtained, while preventing a possible error due to the ascent road from being generated, and an accurate traction control can be obtained.

Although the embodiments of the present invention have been described in detail, it will be understood that the present invention is not limited to the above-described embodiments, and various modifications may be made without departing from the spirit and scope of the invention defined in claims. For example, the engine torque TQENG may be obtained from the engine revolution numbers and the absolute pressure, instead of the engine revolution numbers Ne and the throttle opening degree θ TH. Further, the present invention can be applied not only to the control of grip of the traction control system, but also to an engine torque lower limit limiter.

What is claimed is:

1. A longitudinal grip force estimating device for a vehicle comprising: a longitudinal grip force calculating means for calculating a first longitudinal grip force from a vehicle speed obtained from a follower wheel speed, an engine torque calculating means for calculating an engine torque, a driven wheel torque calculating means for calculating a driven wheel torque from the engine torque, a second longitudinal grip force calculating means for calculating a second longitudinal grip force from a driven wheel torque, and a high select means for comparing the first and the second longitudinal grip forces to select higher one of the first and second longitudinal grip forces as a longitudinal grip force.

2. A longitudinal grip force estimating device according to claim 1, wherein said second longitudinal grip force calculating means calculates said second longitudinal grip force based on said follower wheel speed, engine revolution numbers and a shift position.

3. A slip control device including a longitudinal grip force estimating device according to claim 1, further comprising: a driven wheel speed calculating means for calculating a driven wheel speed of a vehicle, a slip state judging means for comparing a slip rate of the driven wheel calculated from the driven wheel speed and the follower wheel speed with a target slip rate to judge the slip state of the driven wheel, and an engine output control device for controlling the output from the engine based on the slip state of the driven wheel, wherein a total grip force of the vehicle is calculated from a lateral grip force of the vehicle and the longitudinal grip force selected by said high select means, and said target slip rate is corrected by said total grip force.

\* \* \* \* \*